US010630954B2

(12) United States Patent
Krestyannikov et al.

(10) Patent No.: US 10,630,954 B2
(45) Date of Patent: Apr. 21, 2020

(54) ESTIMATION OF ILLUMINATION CHROMATICITY IN AUTOMATIC WHITE BALANCING

(71) Applicant: Intel Corporation, Santa Clara, CA (US)

(72) Inventors: Evgeny Krestyannikov, Tampere (FI); Jarno Nikkanen, Kangasala (FI)

(73) Assignee: Intel Corporation, Santa Clara, CA (US)

( * ) Notice: Subject to any disclaimer, the term of this patent is extended or adjusted under 35 U.S.C. 154(b) by 106 days.

(21) Appl. No.: 15/857,455

(22) Filed: Dec. 28, 2017

(65) Prior Publication Data
US 2019/0045161 A1    Feb. 7, 2019

(51) Int. Cl.
*H04N 9/73* (2006.01)
*G06T 7/90* (2017.01)

(52) U.S. Cl.
CPC .............. *H04N 9/735* (2013.01); *G06T 7/90* (2017.01); *G06T 2207/10016* (2013.01); *G06T 2207/20072* (2013.01); *G06T 2207/20076* (2013.01)

(58) Field of Classification Search
CPC . H04N 9/735; G06T 7/90; G06T 2207/10016; G06T 2207/20076; G06T 2207/20072
See application file for complete search history.

(56) References Cited

U.S. PATENT DOCUMENTS

| 2003/0194125 A1* | 10/2003 | Hubel | H04N 9/735 |
| | | | 382/162 |
| 2006/0203311 A1* | 9/2006 | Weng | H04N 9/735 |
| | | | 358/516 |
| 2013/0162881 A1* | 6/2013 | Sengoku | H04N 5/23293 |
| | | | 348/333.11 |
| 2019/0098274 A1* | 3/2019 | Douady-Pleven | H04N 9/646 |

\* cited by examiner

*Primary Examiner* — Jason A Flohre
(74) *Attorney, Agent, or Firm* — International IP Law Group, P.L.L.C.

(57) ABSTRACT

A method, system, and apparatus are described. The method includes calculating, via a white balancer, a candidate illumination chromaticity estimate for a current frame and calculating, via a scene prior monitor, a scene prior chromaticity for the current frame as a weighted sum of a scene prior chromaticity from a previous frame and a candidate illumination chromaticity estimate. The method also includes calculating, via a scene invariant illumination chromaticity controller, a final illumination chromaticity for the current frame as a weighted sum of a scene illumination chromaticity for the current frame and the candidate illumination chromaticity estimate.

22 Claims, 9 Drawing Sheets

200A

400A

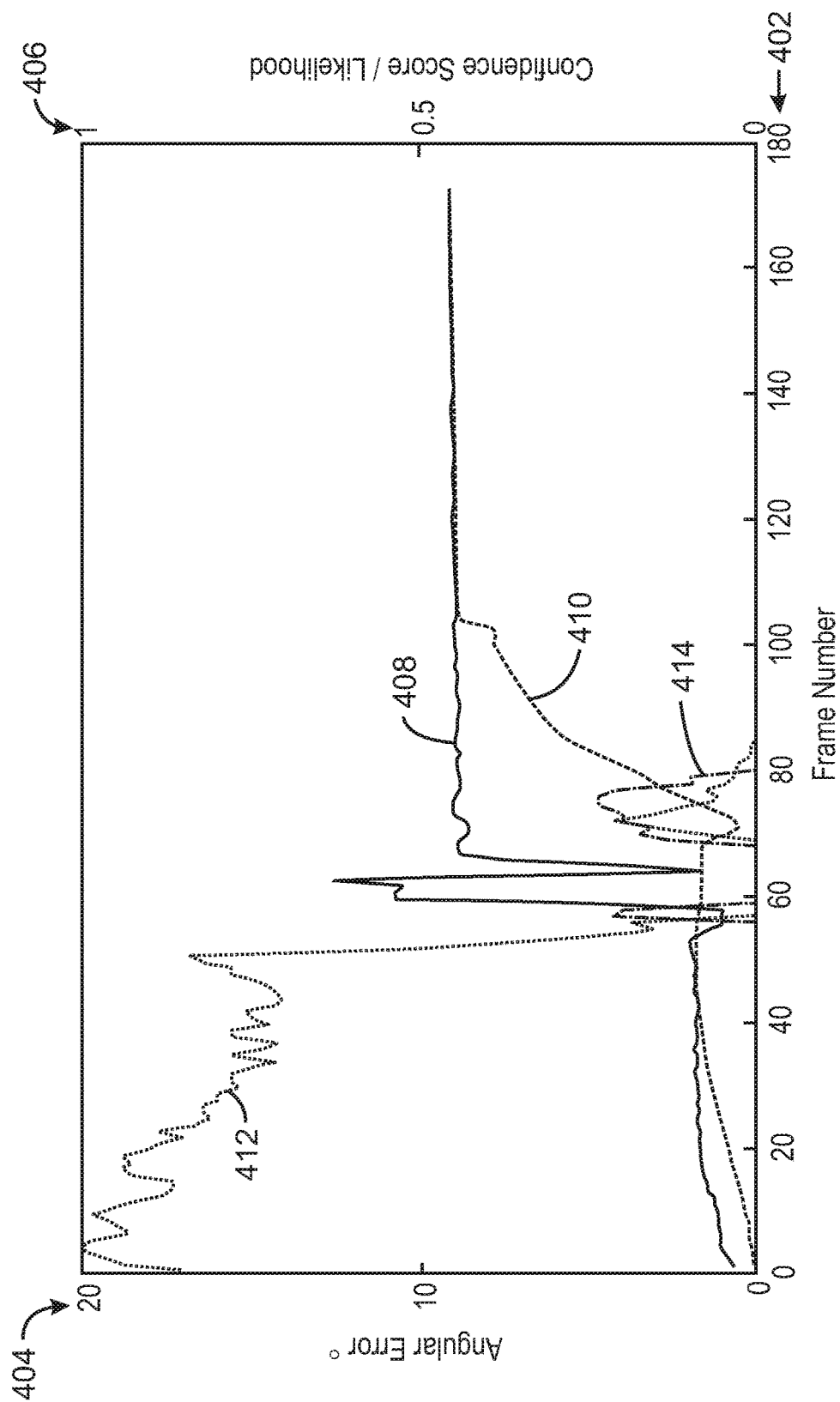

ESTIMATION OF ILLUMINATION CHROMATICITY IN AUTOMATIC WHITE BALANCING

BACKGROUND ART

Automatic white balancing (AWB), also known as color constancy, may be used to describe a set of algorithms that estimate one or more chromaticities of illumination in terms of camera response. This chromaticity of illumination is also known as the white point, which is needed for accurate reproduction of colors in captured images. The chromaticity of illumination may be estimated in terms of the response of the camera sensor color components. AWB typically entails adjustment of the intensities of the different color components to enable color reproduction that a user expects, in which the needed adjustment is highly dependent on image sensor characteristics and ambient illumination conditions at the time of capture.

BRIEF DESCRIPTION OF THE DRAWINGS

FIG. 4C is a graph depicting angular error in a third scene;

The same numbers are used throughout the disclosure and the figures to reference like components and features. Numbers in the 100 series refer to features originally found in FIG. 1; numbers in the 200 series refer to features originally found in FIG. 2; and so on.

DESCRIPTION OF THE EMBODIMENTS

Figure 1:
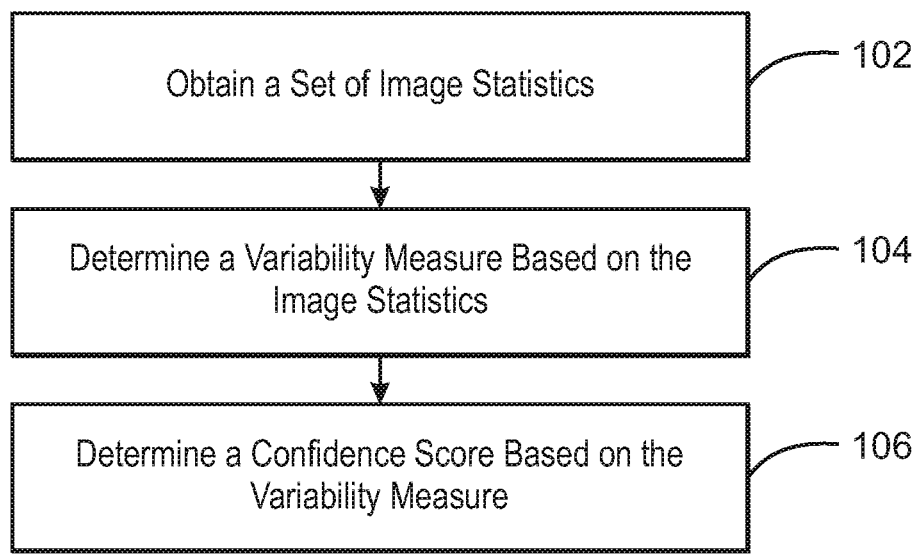
FIG. 1 is a process flow diagram of a method of determining a confidence score.

Camera sensor color component values may vary depending on the chromaticities of various light sources illuminating the image. Different light sources often illuminate an image with varying colors and intensities. Accordingly, to accurately reproduce an image in the manner that the human visual system observes the image, the various colors in the image are adjusted via automatic white balancing (AWB). In some cases, the gain of each color component is adjusted to maintain an accurate white point balance. Human vision has the unique ability of color constancy. This implies that the colors are perceived regardless of the color of the ambient illumination. In mobile imaging applications, similar color constancy is needed to enable accurate and desired color reproduction.

A simplified image formation model, also known as a diagonal model of illumination, describes a set of observed image pixel values y in terms of illumination invariant, or canonical image x via a linear transformation of the form:

$$y = Ax \qquad (1)$$

where A is a diagonal matrix (that is $A_{ij}=0$ if $i \neq j$) that is used to convert image colors from one illumination to another. Neither A nor x are known in advance, which makes the color constancy problem ill-posed. There may exist multiple pairs of A and x that would serve as valid solutions to the observed image y.

Numerous color constancy algorithms focusing on estimation of diagonal entries of matrix A have been proposed in literature during the past few decades. These methods can roughly be categorized to statistics-based approaches which put some statistical assumptions on the distribution of colors in the scene (e.g. grey world or max-RGB algorithms) and model-based approaches (e.g. gamut mapping or color by correlation) which generally utilize the camera module characterization and modeling or learning at some level.

For example, statistical assumptions may be made on the distribution of colors in the scene in a frame based manner. In particular, a gray-edge algorithm is premised on reflections originating from the edges in a raw image data most likely being achromatic. Achromatic regions are therefore obtained from around edges within a scene. In another statistical based approach, an algorithm may assume that the average intensities of the color components are equal in the image. When an image violates the algorithmic assumptions about the colors in the image, the resulting AWB may apply incorrect white balance gains on the image. Similarly, model based approaches, such as gamut mapping or color by correlation, generally utilize a camera module characterization and modeling or learning at some level on a per frame basis. Reliance on camera module characterization (CMC) information can cause AWB to be susceptible to CMC information errors associated with mass-production of the camera modules. CMC-intensive methods may also be computationally expensive.

Embodiments described herein enable the inference of a correct illumination of an unknown light source from a sequence of frames, such as video frames captured by camera imaging device. In embodiments, the present techniques are used to learn the correct parameters of an image formation model including a matrix A when one-frame based AWB methods are likely to succeed, and further re-use those estimates for difficult scenes where multiple equiprobable solutions may exist. As used herein, a correct white point estimate is the estimate that matches the camera sensor response for the spectral power distribution of the illumination.

Traditional techniques may fail due to possible ambiguity of input image data. Moreover, the use of conventional one-frame-based strategies may result in large white balancing errors for consecutive frames, especially if those are indistinguishable in the context of diagonal model of illumination. For example, white wall and brown table scenes are not identifiable for frame-based color constancy algorithms, as the table can be treated as white under lower color temperature illuminant and conversely, the wall can be treated as brown or blue under higher, and lower color temperature illuminants, respectively.

Some embodiments may be implemented in one or a combination of hardware, firmware, and software. Some embodiments may also be implemented as instructions stored on a machine-readable medium, which may be read and executed by a computing platform to perform the operations described herein. A machine-readable medium may include any mechanism for storing or transmitting information in a form readable by a machine, e.g., a computer. For example, a machine-readable medium may include read only memory (ROM); random access memory (RAM); magnetic disk storage media; optical storage media; flash memory devices; or electrical, optical, acoustical or other form of propagated signals, e.g., carrier waves, infrared signals, digital signals, or the interfaces that transmit and/or receive signals, among others.

An embodiment is an implementation or example. Reference in the specification to "an embodiment," "one embodiment," "some embodiments," "various embodiments," or "other embodiments" means that a particular feature, structure, or characteristic described in connection with the embodiments is included in at least some embodiments, but not necessarily all embodiments, of the inventions. The various appearances of "an embodiment," "one embodiment," or "some embodiments" are not necessarily all referring to the same embodiments.

Not all components, features, structures, characteristics, etc. described and illustrated herein need be included in a particular embodiment or embodiments. If the specification states a component, feature, structure, or characteristic "may", "might", "can" or "could" be included, for example, that particular component, feature, structure, or characteristic is not required to be included. If the specification or claim refers to "a" or "an" element, that does not mean there is only one of the element. If the specification or claims refer to "an additional" element, that does not preclude there being more than one of the additional element.

It is to be noted that, although some embodiments have been described in reference to particular implementations, other implementations are possible according to some embodiments. Additionally, the arrangement and/or order of circuit elements or other features illustrated in the drawings and/or described herein need not be arranged in the particular way illustrated and described. Many other arrangements are possible according to some embodiments.

In each system shown in a figure, the elements in some cases may each have a same reference number or a different reference number to suggest that the elements represented could be different and/or similar. However, an element may be flexible enough to have different implementations and work with some or all of the systems shown or described herein. The various elements shown in the figures may be the same or different. Which one is referred to as a first element and which is called a second element is arbitrary.

Embodiments described herein estimate a reliability of AWB analysis of each frame (AWB analysis which is a combination of various frame-based AWB methods), and then re-use the more reliable white points if the contents of the following consecutive frames leads to low reliability AWB results. Note that the temporal analysis described herein does not refer to the known temporal stabilization schemes that are used in digital cameras to ensure stable color convergence (for example temporal filtering of the independent AWB analysis results of each frame). This enables the present techniques to obtain a good white point estimate even if the camera is pointed to difficult framing and image contents that do not result in a good white point estimate.

The primary goal of AWB, also known as color constancy algorithms, is to estimate the correct chromaticity of illumination in terms of camera response, or simply a white point, which is needed for accurate reproduction of colors in captured images. Solving the color constancy problem independently on a frame-by-frame basis may result in large estimation errors between neighboring frames, especially if scene contains large monochromatic objects (for example light brown or light blue) and is not identifiable with conventional methods.

The present techniques enable illumination chromaticity estimation in a temporal domain from a sequence of frames, such as recorded videos, in the presence of arbitrary scene and illumination condition changes. In contrast to the one-frame based methods that treat frames independently of other frames, the present techniques leverage the spatio-temporal information available from adjacent frames. In particular, a scene illumination prior serves as a temporally invariant representation for the current scene illuminant. Further, the prior is incorporated into the white point estimation process. The use of the scene illumination prior value addresses the ill-posed nature of the color constancy problem, and exploits the knowledge of the scene illumination extracted from the temporal context.

The results demonstrate that the present techniques achieve good performance in estimating the unknown light source chromaticity, and can be effectively used to stabilize and reduce the white point estimation error for difficult monochromatic scenes in temporal AWB analysis, especially when combined with traditional statistical-based approaches. As used herein, AWB analysis may be a combination of various frame-based AWB techniques currently known or developed in the future. The reliability of AWB analysis for each frame may be estimated, and then the more reliable white points are reused if the contents of the following consecutive frames leads to low reliability AWB results. The result of the present techniques is a correct white point regardless of the image framing.

FIG. 1 is a process flow diagram of a method 100 of determining a confidence score. Recall that the image formation model includes a diagonal transformation to convert image colors from one illumination to another. In a camera or imaging device, an observed image y is typically transformed by the inverse of the diagonal matrix A, which has white balancing gains on the diagonal, to obtain a canonical image pixel values x. There may exist multiple gain-image pairs that would serve as valid solutions to the observed image. Thus, a confidence score may be assigned to a one frame based algorithm result that estimates the inverse of the diagonal matrix A.

For example, a single frame based solution may comprise a set of characterization independent sub-algorithms, both statistical (such as grey world and grey edge algorithms) and model-based (such as gamut mapping algorithm), which produce a set of initial white point estimates. The results of those sub-algorithms are further combined together by adaptively weighting each sub-algorithm's result based on its performance score. An initial weight curve calculated after adaptive weighting of initial sub-algorithms is used to narrow down the correlated color temperature (CCT) range on the white map, from where the final achromatic point is further found. As used herein, achromatic may refer the characteristic of being without color.

The weakness of the one-frame based color constancy algorithms is that they are scene variant. This means that for the same scene, but for different frame content, which is often the case in temporal AWB analysis, estimates for the chromaticity of illumination may differ. As a result the colors of the same object may look differently depending on the camera framing and what generally becomes very noticeable by the human eye during camera panning or object movement.

A conventional technique of solving ill-posed inverse problems, such as the image formation model, is regularization. During regularization, a penalty term (can also be seen as a prior within the Bayesian framework) is imposed onto unknown variable to identify a solution, or a set of solutions that are more probable amongst the set of all physically realizable and consistent with the data. Reformulating the problem for temporal color constancy problem, the embodiments described herein present a general discriminative measure regarding how easy or difficult solving color constancy is with the given data for a current illuminant estimation task, thus helping to identify a subset of solutions most relevant and consistent with the current color constancy problem, At block 102, a set of image statistics are obtained. Image statistics may include raw histograms collected from the red, green, and blue color channels from an RGB image. The image statistics may be used to identify a likelihood of the one-frame based AWB algorithm to succeed in providing a correct image chromaticity.

In embodiments, the image statistics may be used to test a grey world (GW) hypothesis, which states that an average reflectance of surfaces in the image is achromatic. Put another way, the GW hypothesis states that all the colors in the image average to grey. The hypothesis holds roughly for a wide variety of natural scenes where red, green and blue components are almost equally present in the image. For scenes dominated by single-colored objects, such as white, blue, brown, hypothesis fails as the sample mean is biased by the color of the object.

At block 104, a variability between color channels is determined based on the image statistics. Denoting the raw histograms collected from red, green and blue color channels of an image as $h_R$ $h_G$ $h_B$, variability (v) between channels of the image may be determined as:

$$v = \sum_{i=1}^{N} \frac{(h_{Ri} - \mu_i)^2 + (h_{Gi} - \mu_i)^2 + (h_{Bi} - \mu_i)^2}{h_{Ri} + h_{Gi} + h_{Bi}} \quad (2)$$

where $\mu_i$ is the mean count for histogram bin i. The measure is bounded below by lower bound which is 0, and above by the upper bound defined as follows:

$$B = 2 * \sum_{i=1}^{N} \mu_i = \frac{2}{3} \sum_{i=1}^{N} (h_{Ri} + h_{Gi} + h_{Bi}) \quad (3)$$

The larger the variability v and the more closely it approaches the upper bound B, the higher will be the likelihood of a grey world hypothesis to fail due to the presence of a dominant color in a scene. The opposite is true as well. Near-zero variability between histogram channels implies a strong confidence that the chosen hypothesis holds so the one frame-based AWB algorithm in general, and GW algorithm in particular, will produce reasonable estimates for diagonal elements of matrix A.

At block 106, a grey world confidence score $\alpha_{GW}$ is determined based on the calculated variability v. In embodiments, by choosing certain upper and lower variability levels $t_{high}$ and $t_{low}$ from the range [0:B], the normalized GW confidence score $\alpha_{GW}$ may be defined as given in the procedure below:

If $v < t_{low}$, then $\alpha_{GW} = 1$, else if $v > t_{high}$, then $\alpha_{GW} = 0$, -continued else $\alpha_{GW} = \frac{t_{high} - v}{t_{high} - t_{low}}$.

Figure 2A:
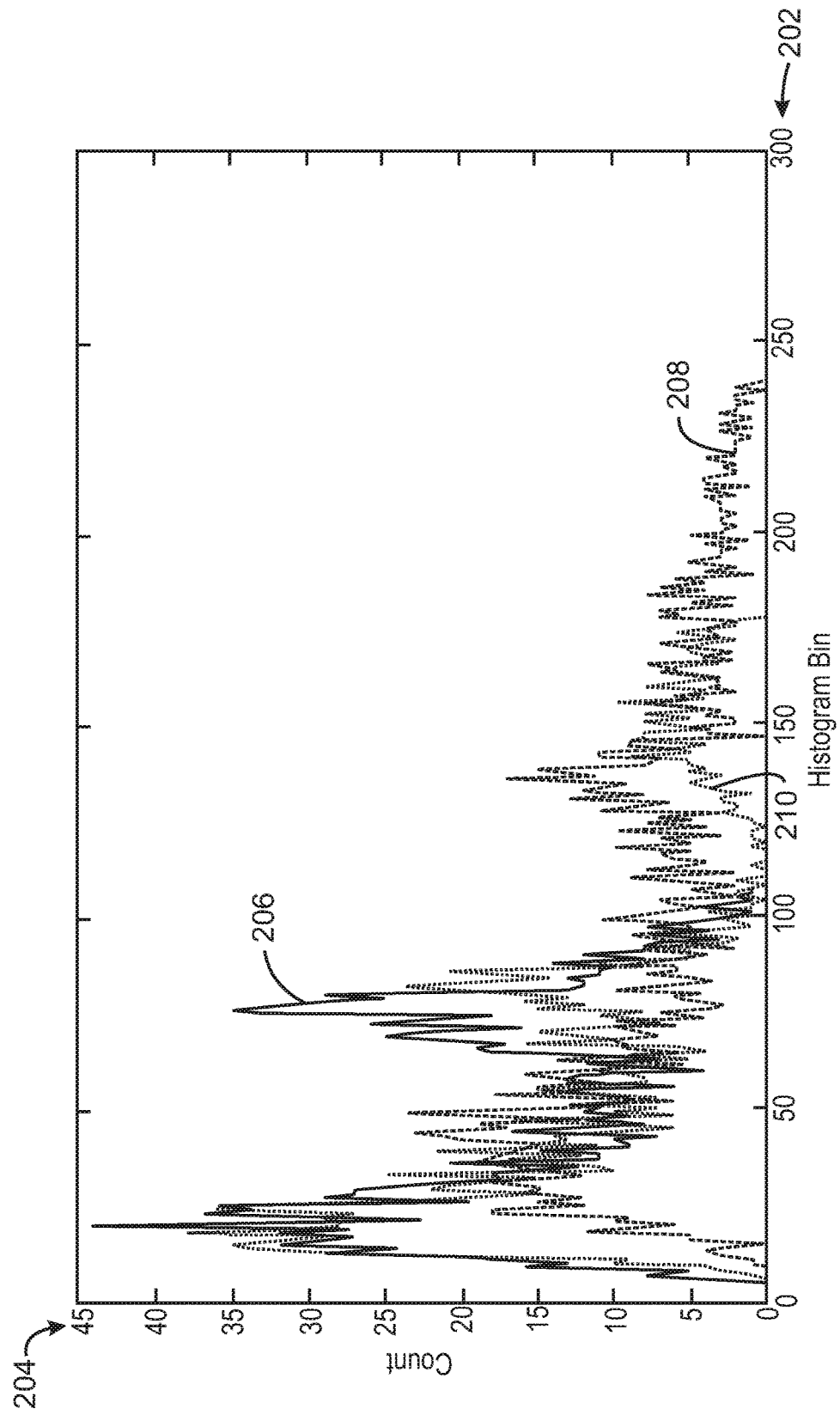
FIGS. 2A and 2B illustrate a histogram 200A and a histogram 200B.
Figure 2B:
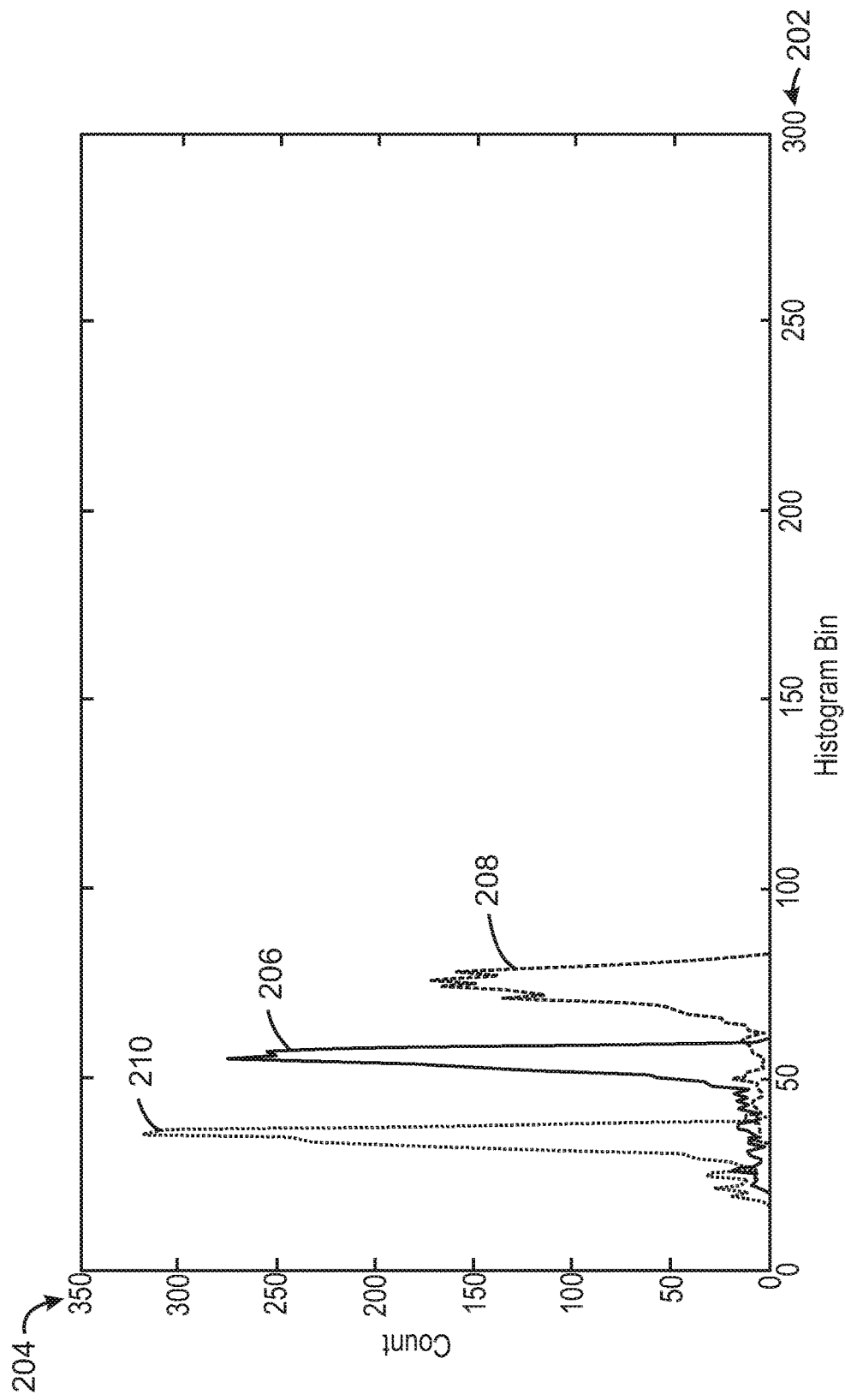

FIGS. 2A and 2B illustrate a histogram 200A and a histogram 200B. In FIGS. 2A and 2B, an x-axis 202 represents 8-bit brightness values in the range [0,255], and a y-axis 204 represents the number of occurrences of each brightness value within the image area. In FIG. 2A, a red channel 206, a green channel 208, and a blue channel 210 of the histogram 200A exhibit a low variability between different channels. Put another way, each color channel is almost equally present in the image that may correspond to a natural colorful scene. As a result of the low variability, a GW hypothesis holds true. By contrast, in FIG. 2B a red channel 206, a green channel 208, and a blue channel 210 of the histogram 200B exhibit a high variability between different channels. Put another way, each channel is well represented in a very narrow range of intensities, thus making the variability v between channels very high and the resulting confidence score $\alpha_{GW}$ very low. In FIG. 2B, the image corresponding to the histogram 200B may be dominated by a single uniformly colored object for which the GW hypothesis may not hold true.

Figure 3:
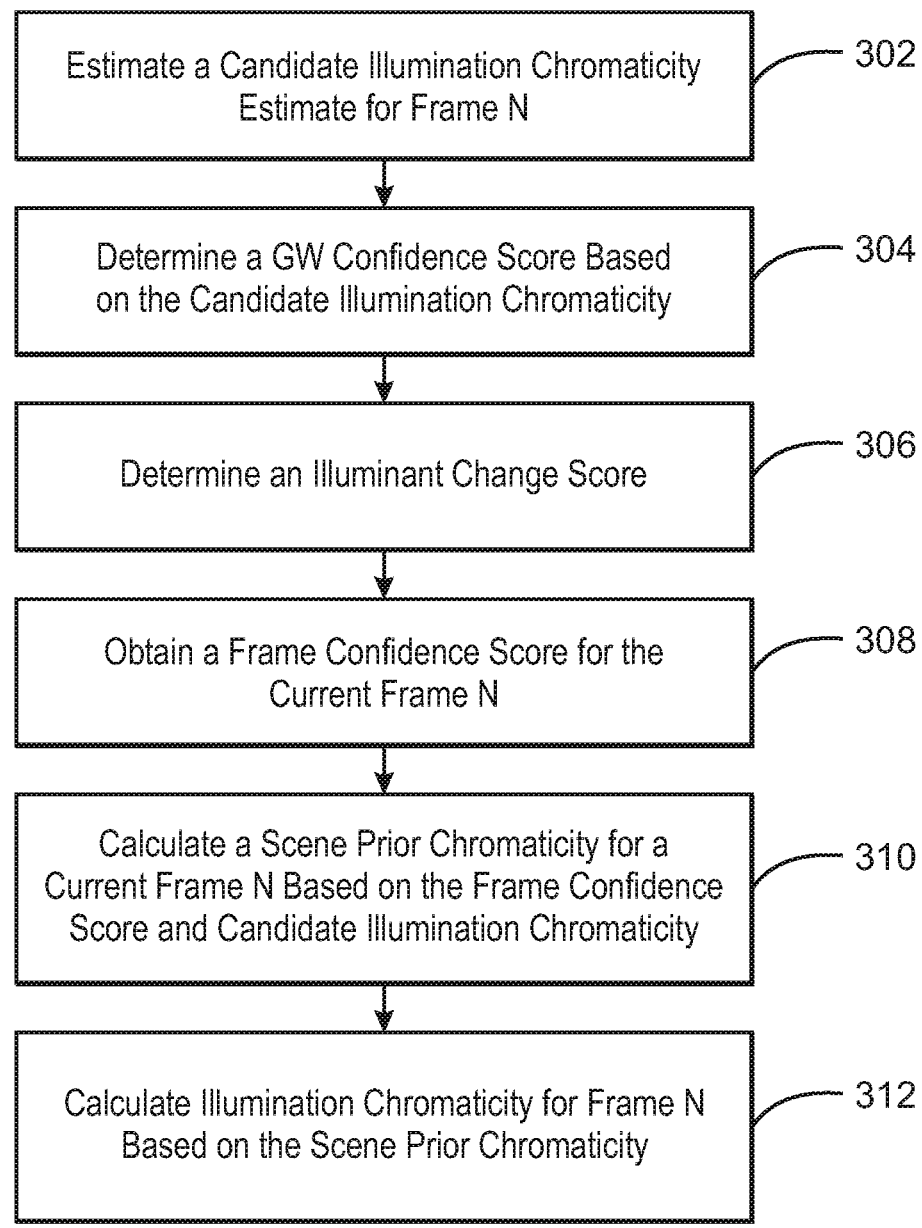
FIG. 3 is a process flow diagram of a method for determining a scene prior term for illumination chromaticity.

FIG. 3 is a process flow diagram of a method 300 for scene invariant automatic white balancing algorithm. In embodiments, the scene prior chromaticity term $c_{scene}$, which is integral to the present techniques, is learnt from the statistics data based on the confidence score $\alpha_{GW}$. The prior term may be used to constrain the image formation model from Eqn. 1 and penalize the unfavorable solutions in favor of those white point estimates that are consistent with the prior. By constraining the image formation model to a most likely favorable solution, the resulting illumination chromaticities can accurately reproduce images as seen in a real world scenario by the human eye. Accordingly, the prior term will replace any unfavorable solutions with a prior or previously determined chromaticity $c_{scene}$, when confidence score is low. When the confidence score is high, the original frame-based results for chromaticity can be used.

At block 302, a candidate illumination chromaticity estimate $c_{frame}$ for frame N is calculated using a single-frame based AWB algorithm. At block 304, a grey world confidence score $\alpha_{GW}$ is determined as described with respect to method 100 (FIG. 1). In particular, if the GW hypothesis holds true with the grey world confidence score $\alpha_{GW}$ values being close to 1, it is likely that also the AWB result calculated at block 302 is accurate and represents the correct chromaticity of illumination for a given scene. If grey world hypothesis fails, the candidate illumination chromaticity estimate $c_{frame}$ found at block 302 likely represents only one out several equally probable outcomes that satisfy model in Eqn. 1, and should be excluded from further analysis.

At block 306, an illuminant change score $\alpha_{illuminant}$ is determined. The illuminant change score $\alpha_{illuminant}$ represents a likelihood of illumination change that may occur simultaneously with the scene change. In one embodiment, this likelihood can be derived via the use of a color shading correction algorithm. Since color shading changes as a function of illumination spectrum, the change of illumination from one light source to another will immediately be observed though the change of variance of the color response across the image area. An illuminant change score $\alpha_{illuminant}$ can be set with respect to the normalized difference in color temperatures of previous light source denoted as $CCT_{light\ source\ 1}$ (6500K as an example), and a current light source, denoted as $CCT_{light\ source\ 2}$ (4500K as an example):

$$\alpha_{illuminant} = \frac{\text{abs}(CCT_{light\ source\ 1} - CCT_{light\ source\ 2})}{CCT_{max}} \qquad (4)$$

where $CCT_{max}$ is the maximum allowed CCT difference between two light sources (3000K as an example).

At block 308, a frame confidence score α for the candidate illumination chromaticity estimate $c_{frame}$ is determined. In embodiments, the frame confidence score α is the sum of the grey world confidence score and the illuminant change score, or $\alpha = \alpha_{GW} + \alpha_{illuminant}$. The frame confidence score α represents how accurately the current illumination chromaticity matches the scene illuminant, and may be within the range [0,1]. Values close to 1 imply that current estimate $c_{frame}$ matches the current scene illuminant, and vice versa—a frame confidence score α at or near zero implies there is no match between the candidate estimate and the scene prior. The illuminant change score $\alpha_{illuminant}$ is introduced to avoid locking the scene chromaticity to the previously estimated illuminant under the illumination condition changes when $\alpha_{GW}$ term vanishes.

At block 310 the scene prior chromaticity $c_{scene}$ for frame N is calculated as a weighted average between the scene prior chromaticity from the previous frame N−1 and a candidate illumination chromaticity estimate $c_{frame}$. In particular, the scene prior chromaticity $c_{scene}$ for frame N is calculated as:

$$c_{scene}(N) = (1-\alpha)c_{scene}(N-1) + \alpha c_{frame}(N) \qquad (5)$$

where $c_{scene}(N-1)$ is the scene prior chromaticity from the previous frame N−1, and $c_{frame}(N)$ is the white point estimate calculated via a one-frame based AWB algorithm at block 302.

At block 312, the resulting illumination chromaticity for frame N may be calculated based on the scene prior chromaticity for frame N as follows:

$$c_{result}(N) = (1-\alpha)c_{scene}(N) + \alpha c_{frame}(N)$$

In embodiments, the scene prior term $c_{scene}(N)$ is used to penalize the current frame white point estimate $c_{frame}(N)$ with respect the frame confidence score α. If score is low and $c_{frame}(N)$ poorly matches the current scene illuminant, resulting white point is taken to fit the temporally invariant prior term $c_{scene}(N)$ that reflects beliefs about the true illumination chromaticity.

Figure 4A:
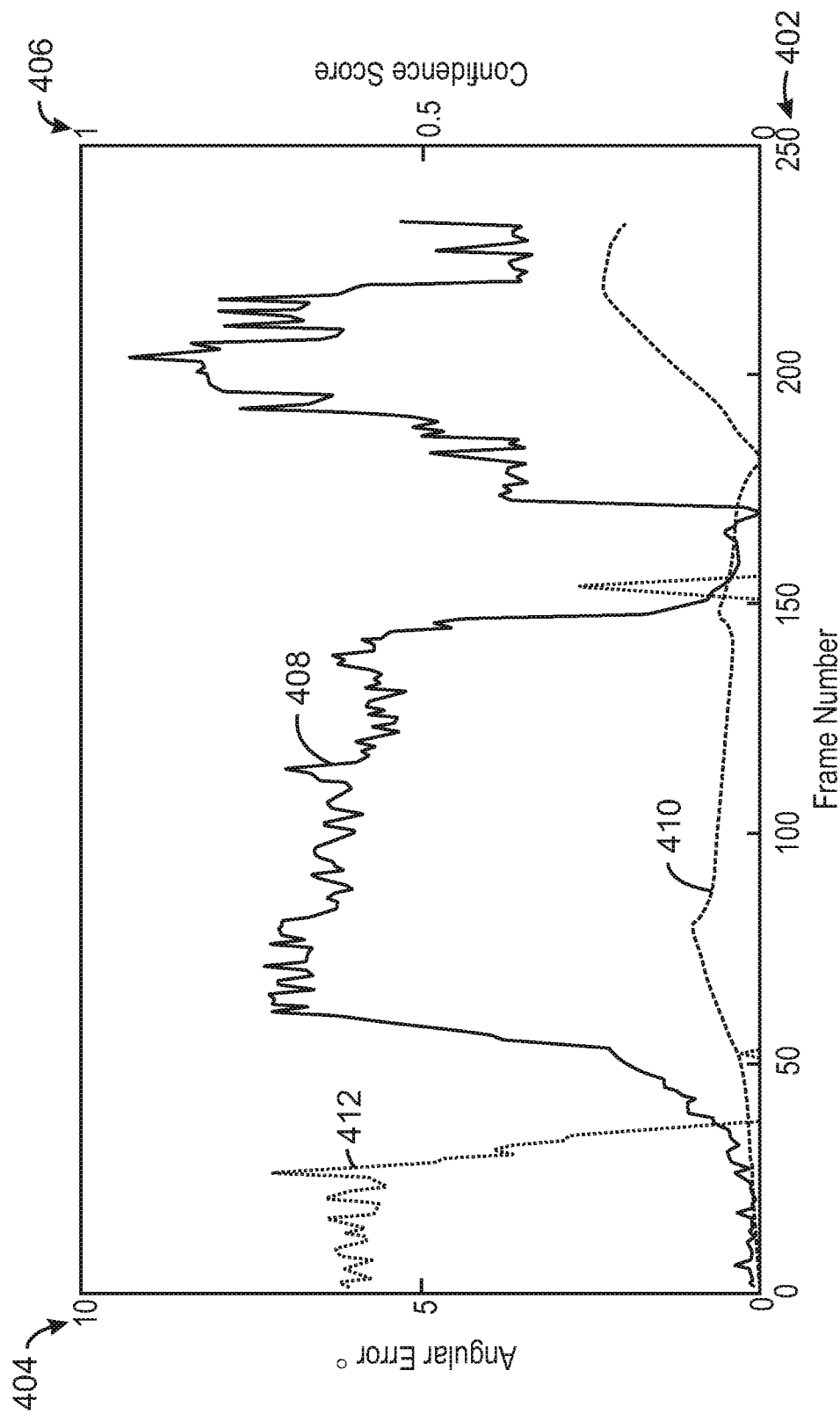
FIG. 4A is a graph depicting angular error in a first scene.

FIG. 4A is a graph 400A depicting angular error 404 for illumination chromaticity estimate in a test indoor sequence plotted versus the frame number 402 for one-frame based AWB algorithm 408, and for the temporally stabilized scene invariant color constancy approach 410. A frame confidence score α 412 is overlaid on the graph 400A plotting the frame number 402 against the confidence score 406. The frame confidence score α here is contributed entirely by $\alpha_{GW}$, where $\alpha_{illuminant}$ is set to zero. In the graph 400A, the first 40 frames include scene with approximately equal distribution of colors and a high confidence score, while the remainder of the frames are pointing to the single colored object with very low confidence score.

The graph 400A suggests that the scene invariant color constancy approach at 410 attains a much lower angular error for the video sequence through learning the accurate scene chromaticity when GW hypothesis holds and one-frame based AWB results are trustable; while further penalizing the ambiguous estimate in favor of more reliable and robust prior learned from previous frames.

Figure 4B:
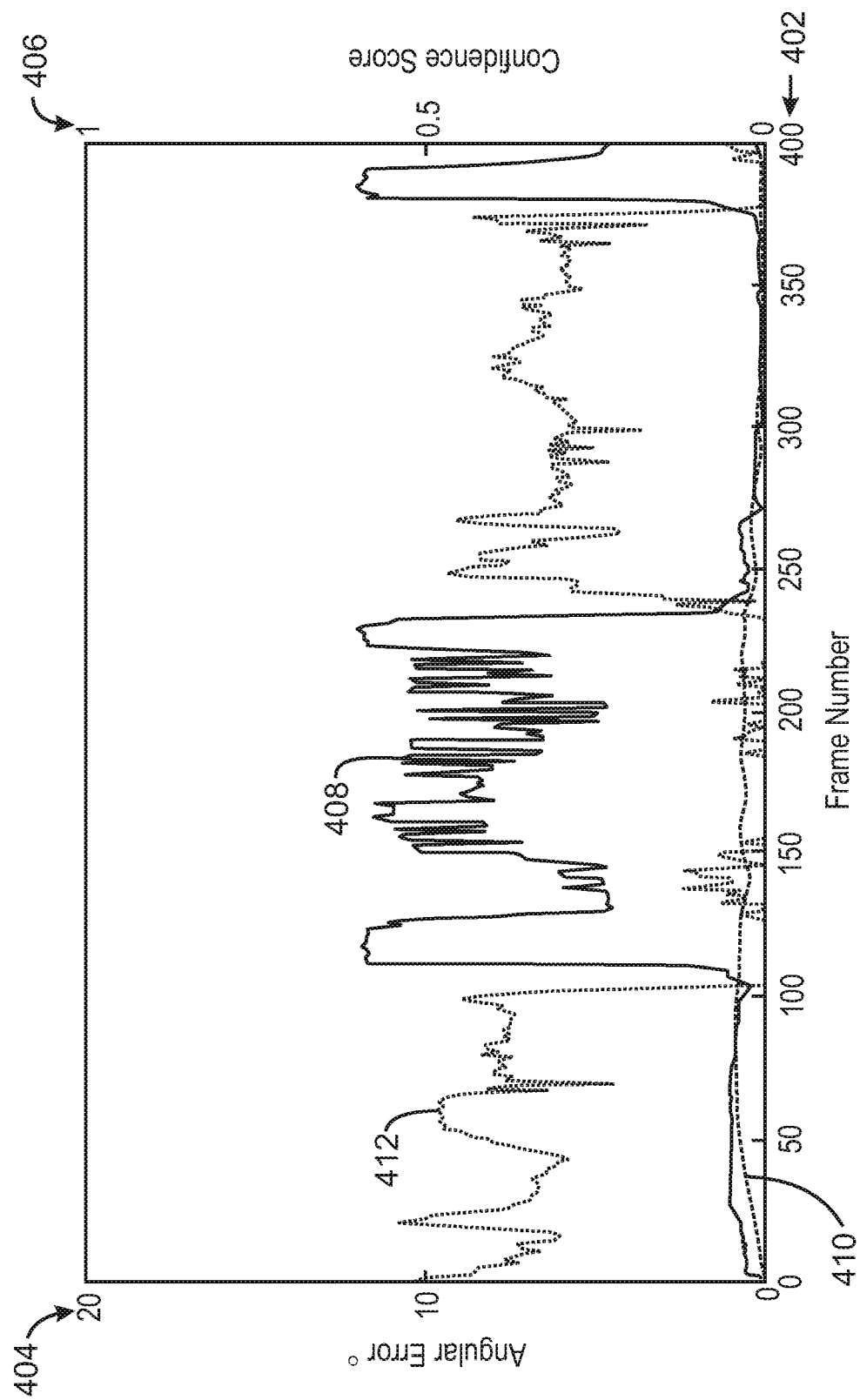
FIG. 4B is a graph depicting angular error in a second scene.

FIG. 4B is a graph 400B depicting angular error in a second video sequence that represents an outdoor scene. The video sequence may mimic a person walking and recording a video where the frame content alternates between a street view and the green grass. For example, frames 1-100 and 240-380 may be predominately a street view. Frames 101-239 and 381-410 may be portions of the scene that is predominately a view of green grass. A video sequence including frames from scene with a large amount of one color, namely green grass, may pose a challenge to one-frame based AWB algorithms due to very small image gamut size, presence of monochromatic green/brown grass content, and lack of achromatic objects in the scene. As observed in graph 400B, the present techniques determined the accurate scene chromaticity from the street view frames (frames 1-100, and 240-380), and has further stabilized the estimated matrix of white balancing gains at frames 101-239 and 381-410 with respect to the previously found scene-based prior illuminant as illustrated by the angular error 410. Notice that the frame confidence score 412 is low when the camera is pointing to the green grass and error in the one frame based AWB approach at 408 is high.

FIG. 4C is a graph 400C depicting angular error in a third video sequence. The graph 400C demonstrates the performance of the scene-invariant AWB algorithm in the presence of both scene and light source changes. The scene is a video sequence that simulates a camera move from an outdoor scene at correlated color temperature (CCT) around 6000K to an indoor office scene at CCT around 3600K. Assume the indoor scene is ambiguous with a large variability in histogram between different color channels instead of using both scenes with relatively high GW confidence scores. A scene with relatively high GW confidence scores is an easy use case for scene-invariant AWB approach, and its behavior should not differ from one-frame based AWB algorithm.

In graph 400C, both approaches 408 and 410 have correctly identified the outdoor and indoor illumination chromaticities from frame 0 to frame 60. The jump in angular error around frame 60 reflects the light source change from outdoor scene (set as reference) to indoor that happened between frames 40 and 80. A much smoother convergence of scene invariant AWB approach 410 is explained by iterative nature of the scene prior calculation that introduces temporal stabilization of white point estimate. Also note that the illumination change has also been correctly identified and illuminant change score $\alpha_{illuminant}$ 412 in the graph 400C has been set during the transition period to drive the scene illumination towards the one-frame-based based candidate estimate.

Figure 5:
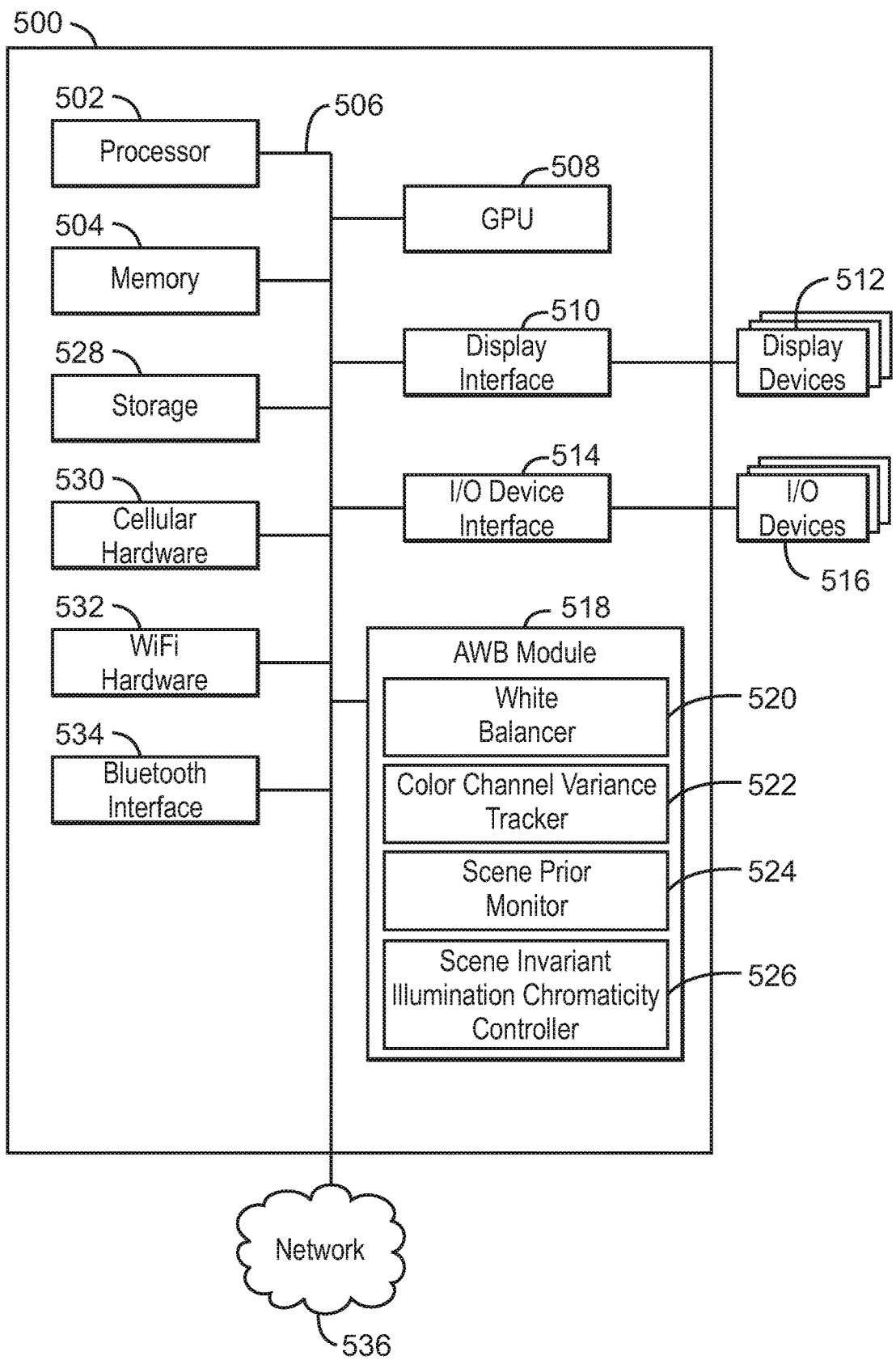
FIG. 5 is a block diagram of an exemplary system that enables an estimation of illumination chromaticity in automatic white balancing.

FIG. 5 is a block diagram of an exemplary system that enables an estimation of illumination chromaticity in automatic white balancing. The electronic device 500 may be, for example, a laptop computer, tablet computer, mobile phone, smart phone, or a wearable device, among others. The electronic device 500 may be used to receive and render media such as images and videos. The electronic device 500 may include a central processing unit (CPU) 502 that is configured to execute stored instructions, as well as a memory device 504 that stores instructions that are executable by the CPU 502. The CPU may be coupled to the memory device 504 by a bus 506. Additionally, the CPU 502 can be a single core processor, a multi-core processor, a computing cluster, or any number of other configurations. Furthermore, the electronic device 500 may include more than one CPU 502. The memory device 504 can include random access memory (RAM), read only memory (ROM), flash memory, or any other suitable memory systems. For example, the memory device 504 may include dynamic random access memory (DRAM).

The electronic device 500 also includes a graphics processing unit (GPU) 508. As shown, the CPU 502 can be coupled through the bus 506 to the GPU 508. The GPU 508 can be configured to perform any number of graphics operations within the electronic device 500. For example, the GPU 508 can be configured to render or manipulate graphics images, graphics frames, videos, streaming data, or the like, to be rendered or displayed to a user of the electronic device 500. In some embodiments, the GPU 508 includes a number of graphics engines, wherein each graphics engine is configured to perform specific graphics tasks, or to execute specific types of workloads.

The CPU 502 can be linked through the bus 506 to a display interface 510 configured to connect the electronic device 500 to one or more display devices 512. The display devices 512 can include a display screen that is a built-in component of the electronic device 500. In embodiments, the display interface 510 is coupled with the display devices 512 via any networking technology such as cellular hardware 530, Wi-Fi hardware 532, or Bluetooth Interface 534 across the network 536. The display devices 512 can also include a computer monitor, television, or projector, among others, that is externally connected to the electronic device 500.

The CPU 502 can also be connected through the bus 506 to an input/output (I/O) device interface 514 configured to connect the electronic device 500 to one or more I/O devices 516. The I/O devices 516 can include, for example, a keyboard and a pointing device, wherein the pointing device can include a touchpad or a touchscreen, among others. The I/O devices 516 can be built-in components of the electronic device 500, or can be devices that are externally connected to the electronic device 500. Accordingly, in embodiments, the I/O device interface 514 is coupled with the I/O devices 516 via any networking technology such as cellular hardware 530, Wi-Fi hardware 532, or Bluetooth Interface 534 across the network 536. The I/O devices 516 can also include any I/O device that is externally connected to the electronic device 500.

An automatic white balancing module 518 may be used to enable the inference of a correct illumination of an unknown light source from a sequence of frames, such as video frames captured by camera imaging device. In examples, the content may be rendered on a remote display via a wired or wireless connection. The content may also be rendered on a local display. The AWB module may include a white balancer 520. The white balancer 520 may estimate the correct chromaticity of illumination or white point in terms of camera response. The white point may be a single frame white point that is estimated via a set of characterization independent sub-algorithms, both statistical (such as grey world and grey edge algorithms) and model-based (such as gamut mapping algorithm), which produce a set of initial white point estimates.

The AWB module may also include a color change variance tracker 622. The color change variance tracker 522 is to determine a variability v between different color channels based on the image statistics. The variance tracker may also determine a confidence score based on the variability v. Additionally, the AWB module may include a scene prior monitor 524. The scene prior monitor is used to determine a scene prior term for illumination chromaticity based on a grey world confidence score $\alpha_{GW}$. Finally, the AWB module may include a scene invariant illumination chromaticity controller 626. The scene invariant illumination chromaticity controller 526 may include calculation of the resulting illumination chromaticity for a current frame N based on a weighted average between the scene illumination chromaticity from that frame obtained from block 524 and a candidate illumination chromaticity estimate computed at block 520.

The electronic device 500 may also include a storage device 528. The storage device 528 is a physical memory such as a hard drive, an optical drive, a flash drive, an array of drives, or any combinations thereof. The storage device 528 can store user data, such as audio files, video files, audio/video files, and picture files, among others. The storage device 528 can also store programming code such as device drivers, software applications, operating systems, and the like. The programming code stored to the storage device 528 may be executed by the CPU 502, GPU 508, or any other processors that may be included in the electronic device 500.

The CPU 502 may be linked through the bus 506 to cellular hardware 530. The cellular hardware 530 may be any cellular technology, for example, the 4G standard (International Mobile Telecommunications-Advanced (IMT-Advanced) Standard promulgated by the International Telecommunications Union—Radio communication Sector (ITU-R)). In this manner, the electronic device 500 may access any network 536 without being tethered or paired to another device, where the cellular hardware 530 enables access to the network 536.

The CPU 502 may also be linked through the bus 506 to Wi-Fi hardware 532. The Wi-Fi hardware 532 is hardware according to Wi-Fi standards (standards promulgated as Institute of Electrical and Electronics Engineers' (IEEE) 802.11 standards). The Wi-Fi hardware 532 enables the electronic device 500 to connect to the Internet using the Transmission Control Protocol and the Internet Protocol (TCP/IP). Accordingly, the electronic device 500 can enable end-to-end connectivity with the Internet by addressing, routing, transmitting, and receiving data according to the TCP/IP protocol without the use of another device. Additionally, a Bluetooth Interface 534 may be coupled to the CPU 502 through the bus 506. The Bluetooth Interface 534 is an interface according to Bluetooth networks (based on the Bluetooth standard promulgated by the Bluetooth Special Interest Group). The Bluetooth Interface 534 enables the electronic device 500 to be paired with other Bluetooth enabled devices through a personal area network (PAN). Accordingly, the network 536 may be a PAN. Examples of Bluetooth enabled devices include a laptop computer, desktop computer, ultrabook, tablet computer, mobile device, or server, among others.

The block diagram of FIG. 5 is not intended to indicate that the electronic device 500 is to include all of the components shown in FIG. 5. Rather, the computing system 500 can include fewer or additional components not illustrated in FIG. 5 (e.g., sensors, power management integrated circuits, additional network interfaces, etc.). The electronic device 500 may include any number of additional components not shown in FIG. 5, depending on the details of the specific implementation. Furthermore, any of the functionalities of the CPU 502 may be partially, or entirely, implemented in hardware and/or in a processor. For example, the functionality may be implemented with an application specific integrated circuit, in logic implemented in a processor, in logic implemented in a specialized graphics processing unit, or in any other device.

Figure 6:
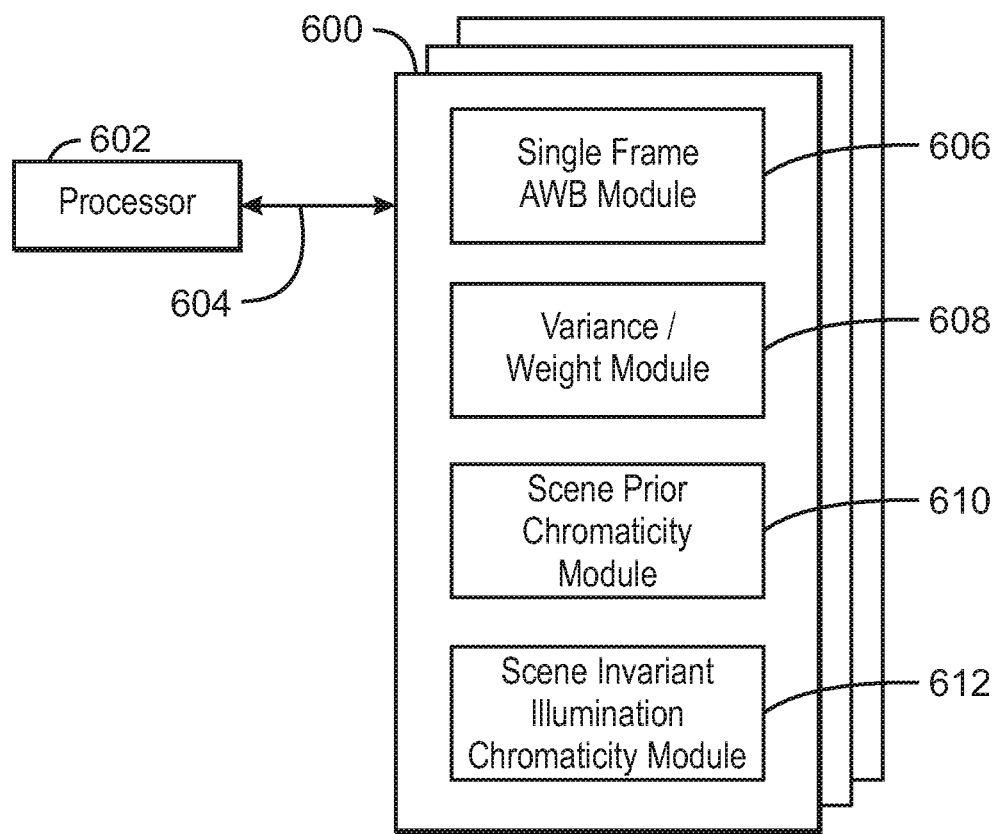
FIG. 6 is a block diagram showing a medium that contains logic for estimation of illumination chromaticity in automatic white balancing.

FIG. 6 is a block diagram showing a medium 600 that contains logic for estimation of illumination chromaticity in automatic white balancing. The medium 600 may be a computer-readable medium, including a non-transitory medium that stores code that can be accessed by a processor 602 over a computer bus 604. For example, the computer-readable medium 600 can be volatile or non-volatile data storage device. The medium 600 can also be a logic unit, such as an Application Specific Integrated Circuit (ASIC), a Field Programmable Gate Array (FPGA), or an arrangement of logic gates implemented in one or more integrated circuits, for example.

The medium 600 may include modules 606-612 configured to perform the techniques described herein. For example, a single frame AWB module 606 may be configured to estimate the correct chromaticity of illumination or white point in terms of camera response from a single frame. The white point may be estimated via a set of characterization independent sub-algorithms, both statistical (such as grey world and grey edge algorithms) and model-based (such as gamut mapping algorithm), which produce a set of initial white point estimates. A variance/weight module 608 may be configured to determine a variability v based on the image statistics. The variance tracker may also determine a frame confidence score and the grey world confidence score $\alpha_{GW}$ based on the variability v. A scene prior chromaticity module 610 may be configured to determine a scene prior term for illumination chromaticity based on a confidence score $\alpha_{GW}$. An illumination chromaticity module 612 may be configured to calculate the resulting illumination chromaticity for a current frame N based on a weighted average between the scene illumination chromaticity from that frame and a candidate illumination chromaticity estimate calculated by module 606.

The block diagram of FIG. 6 is not intended to indicate that the medium 600 is to include all of the components shown in FIG. 6. Further, the medium 600 may include any number of additional components not shown in FIG. 6, depending on the details of the specific implementation.

Example 1 is a method. The method includes calculating, via a white balancer, a candidate illumination chromaticity estimate for a current frame; calculating, via a scene prior monitor, a scene prior chromaticity for the current frame as a weighted sum of a scene prior chromaticity from a previous frame and a candidate illumination chromaticity estimate; calculating, via a scene invariant illumination chromaticity controller, a final illumination chromaticity for the current frame as a weighted sum of a scene illumination chromaticity for the current frame and the candidate illumination chromaticity estimate.

Example 2 includes the method of example 1, including or excluding optional features. In this example, the scene prior chromaticity from the previous frame comprises a frame confidence score that is determined as a sum of a single frame AWB confidence score and an illuminant change score.

Example 3 includes the method of any one of examples 1 to 2, including or excluding optional features. In this example, the scene prior chromaticity from the previous frame comprises a frame confidence score that is determined as a sum of a single frame AWB confidence score and an illuminant change score, wherein the single frame AWB confidence score identifies a likelihood that a single-frame based AWB algorithm estimate is correct. Optionally, the single frame AWB confidence score is based on an RGB histogram variability measure. Optionally, the illuminant change score is a likelihood that an illumination change occurs simultaneously with a scene change.

Example 4 includes the method of any one of examples 1 to 3, including or excluding optional features. In this example, the scene prior chromaticity for the current frame is to constrain an image formation model to a most likely favorable solution.

Example 5 includes the method of any one of examples 1 to 4, including or excluding optional features. In this example, the candidate illumination chromaticity estimate for the current frame is determined via a single frame based AWB algorithm.

Example 6 includes the method of any one of examples 1 to 5, including or excluding optional features. In this example, the final illumination chromaticity corresponds to diagonal elements of a matrix A of white balancing gains.

Example 7 includes the method of any one of examples 1 to 6, including or excluding optional features. In this example, the final illumination chromaticity is an estimate of white balancing gains in a temporal domain from a sequence of frames.

Example 8 includes the method of any one of examples 1 to 7, including or excluding optional features. In this example, the scene prior chromaticity for the current frame is a temporally invariant representation for the current scene illuminant.

Example 9 is an apparatus. The apparatus includes a white balancer to calculate a candidate illumination chromaticity estimate for a current frame; a scene prior monitor to calculate a scene prior chromaticity for the current frame as a weighted sum of scene prior chromaticity from a previous frame and a candidate illumination chromaticity estimate; a scene invariant illumination chromaticity controller to calculate a final illumination chromaticity for the current frame as a weighted sum of scene illumination chromaticity for the current frame and the candidate illumination chromaticity estimate.

Example 10 includes the apparatus of example 9, including or excluding optional features. In this example, the scene prior chromaticity from a previous frame comprises a frame confidence score that is determined as a weighted sum of a single frame AWB confidence score and an illuminant change score.

Example 11 includes the apparatus of any one of examples 9 to 10, including or excluding optional features. In this example, the weighted scene prior chromaticity from the previous frame comprises a frame confidence score that is determined as a sum of a single frame AWB confidence score and an illuminant change score, wherein the single frame AWB confidence score identifies a likelihood that a single-frame based AWB algorithm estimate is correct. Optionally, the single frame AWB confidence score is based on an RGB histogram variability measure. Optionally, the illuminant confidence score is a likelihood that an illumination change occurs simultaneously with a scene change.

Example 12 includes the apparatus of any one of examples 9 to 11, including or excluding optional features. In this example, the scene prior chromaticity for the current frame is to constrain an image formation model to a most likely favorable solution.

Example 13 includes the apparatus of any one of examples 9 to 12, including or excluding optional features. In this example, the candidate illumination chromaticity estimate for the current frame is determined via a single frame based AWB algorithm.

Example 14 includes the apparatus of any one of examples 9 to 13, including or excluding optional features. In this example, the final illumination chromaticity corresponds to diagonal elements of a matrix A of white balancing gains.

Example 15 includes the apparatus of any one of examples 9 to 14, including or excluding optional features. In this example, the final illumination chromaticity is an estimate of white balancing gains in a temporal domain from a sequence of frames.

Example 16 includes the apparatus of any one of examples 9 to 15, including or excluding optional features. In this example, the scene prior chromaticity for the current frame is a temporally invariant representation for the current scene illuminant.

Example 17 is a system. The system includes an image capture device; a memory that is to store instructions and that is communicatively coupled to the image capture device; and a processor communicatively coupled to the image capture device and the memory, wherein when the processor is to execute the instructions, the processor is to: calculate a candidate illumination chromaticity estimate for a current frame; calculate a scene prior chromaticity for the current frame as a weighted sum of a scene prior chromaticity from a previous frame and a candidate illumination chromaticity estimate; and calculate a final illumination chromaticity for the current frame as a weighted sum of a scene illumination chromaticity for the current frame and the candidate illumination chromaticity estimate.

Example 18 includes the system of example 17, including or excluding optional features. In this example, the scene prior chromaticity from the previous frame comprises a frame confidence score that is determined as a sum of a single frame AWB confidence score and an illuminant change score.

Example 19 includes the system of any one of examples 17 to 18, including or excluding optional features. In this example, the scene prior chromaticity from the previous frame comprises a frame confidence score that is determined as a sum of a single frame AWB confidence score and an illuminant change score, wherein the single frame AWB confidence score identifies a likelihood that a single-frame based AWB algorithm estimate is correct. Optionally, the single frame AWB confidence score is based on an RGB histogram variability measure. Optionally, the illuminant change score is a likelihood that an illumination change occurs simultaneously with a scene change.

Example 20 includes the system of any one of examples 17 to 19, including or excluding optional features. In this example, the scene prior chromaticity for the current frame is to constrain an image formation model to a most likely favorable solution.

Example 21 includes the system of any one of examples 17 to 20, including or excluding optional features. In this example, the candidate illumination chromaticity estimate for the current frame is determined via a single frame based AWB algorithm.

Example 22 includes the system of any one of examples 17 to 21, including or excluding optional features. In this example, the final illumination chromaticity corresponds to diagonal elements of a matrix A of white balancing gains.

Example 23 includes the system of any one of examples 17 to 22, including or excluding optional features. In this example, the final illumination chromaticity is an estimate of white balancing gains in a temporal domain from a sequence of frames.

Example 24 includes the system of any one of examples 17 to 23, including or excluding optional features. In this example, the scene prior chromaticity for the current frame is a temporally invariant representation for the current scene illuminant.

Example 25 is at least one non-transitory machine readable medium having instructions stored therein. The computer-readable medium includes instructions that direct the processor to calculate, via a white balancer, a candidate illumination chromaticity estimate for a current frame; calculate, via a scene prior monitor, a scene prior chromaticity for the current frame as a weighted sum of a scene prior chromaticity from a previous frame and a candidate illumination chromaticity estimate; calculate, via a scene invariant illumination chromaticity controller, a final illumination chromaticity for the current frame as a weighted sum of a scene illumination chromaticity for the current frame and the candidate illumination chromaticity estimate.

Example 26 includes the computer-readable medium of example 25, including or excluding optional features. In this example, the scene prior chromaticity from the previous frame comprises a frame confidence score that is determined as a sum of a single frame AWB confidence score and an illuminant change score.

Example 27 includes the computer-readable medium of any one of examples 25 to 26, including or excluding optional features. In this example, the scene prior chromaticity from the previous frame comprises a frame confidence score that is determined as a sum of a single frame AWB confidence score and an illuminant change score, wherein the single frame AWB confidence score identifies a likelihood that a single-frame based AWB algorithm estimate is correct. Optionally, the single frame AWB confidence score is based on an RGB histogram variability measure. Optionally, the illuminant change score is a likelihood that an illumination change occurs simultaneously with a scene change.

Example 28 includes the computer-readable medium of any one of examples 25 to 27, including or excluding optional features. In this example, the scene prior chromaticity for the current frame is to constrain an image formation model to a most likely favorable solution.

Example 29 includes the computer-readable medium of any one of examples 25 to 28, including or excluding optional features. In this example, the candidate illumination chromaticity estimate for the current frame is determined via a single frame based AWB algorithm.

Example 30 includes the computer-readable medium of any one of examples 25 to 29, including or excluding optional features. In this example, the final illumination chromaticity corresponds to diagonal elements of a matrix A of white balancing gains.

Example 31 includes the computer-readable medium of any one of examples 25 to 30, including or excluding optional features. In this example, the final illumination chromaticity is an estimate of white balancing gains in a temporal domain from a sequence of frames.

Example 32 includes the computer-readable medium of any one of examples 25 to 31, including or excluding optional features. In this example, the scene prior chromaticity for the current frame is a temporally invariant representation for the current scene illuminant.

Example 33 is an apparatus. The apparatus includes instructions that direct the processor to a white balancer to calculate a candidate illumination chromaticity estimate for a current frame; a means to calculate a scene prior chromaticity for the current frame as a weighted sum of scene prior chromaticity from a previous frame and a candidate illumination chromaticity estimate; a scene invariant illumination chromaticity controller to calculate a final illumination chromaticity for the current frame as a weighted sum of scene illumination chromaticity for the current frame and the candidate illumination chromaticity estimate.

Example 34 includes the apparatus of example 33, including or excluding optional features. In this example, the scene prior chromaticity from a previous frame comprises a frame confidence score that is determined as a weighted sum of a single frame AWB confidence score and an illuminant change score.

Example 35 includes the apparatus of any one of examples 33 to 34, including or excluding optional features. In this example, the weighted scene prior chromaticity from the previous frame comprises a frame confidence score that is determined as a sum of a single frame AWB confidence score and an illuminant change score, wherein the single frame AWB confidence score identifies a likelihood that a single-frame based AWB algorithm estimate is correct. Optionally, the single frame AWB confidence score is based on an RGB histogram variability measure. Optionally, the illuminant confidence score is a likelihood that an illumination change occurs simultaneously with a scene change.

Example 36 includes the apparatus of any one of examples 33 to 35, including or excluding optional features. In this example, the means to calculate a scene prior chromaticity for the current frame is to constrain an image formation model to a most likely favorable solution.

Example 37 includes the apparatus of any one of examples 33 to 36, including or excluding optional features. In this example, the candidate illumination chromaticity estimate for the current frame is determined via a single frame based AWB algorithm.

Example 38 includes the apparatus of any one of examples 33 to 37, including or excluding optional features. In this example, the final illumination chromaticity corresponds to diagonal elements of a matrix A of white balancing gains.

Example 39 includes the apparatus of any one of examples 33 to 38, including or excluding optional features. In this example, the final illumination chromaticity is an estimate of white balancing gains in a temporal domain from a sequence of frames.

Example 40 includes the apparatus of any one of examples 33 to 39, including or excluding optional features. In this example, the means to calculate a scene prior chromaticity for the current frame is a temporally invariant representation for the current scene illuminant.

It is to be understood that specifics in the aforementioned examples may be used anywhere in one or more embodiments. For instance, all optional features of the computing device described above may also be implemented with respect to either of the methods or the computer-readable medium described herein. Furthermore, although flow diagrams and/or state diagrams may have been used herein to describe embodiments, the inventions are not limited to those diagrams or to corresponding descriptions herein. For example, flow need not move through each illustrated box or state or in exactly the same order as illustrated and described herein The inventions are not restricted to the particular details listed herein. Indeed, those skilled in the art having the benefit of this disclosure will appreciate that many other variations from the foregoing description and drawings may be made within the scope of the present inventions. Accordingly, it is the following claims including any amendments thereto that define the scope of the inventions.

What is claimed is:

1. A method, comprising:
   calculating, via a white balancer, a candidate illumination chromaticity estimate for a current frame;
   calculating, via a scene prior monitor, a scene prior chromaticity for the current frame as a weighted sum of a scene prior chromaticity from a previous frame and the candidate illumination chromaticity estimate, wherein the scene prior chromaticity from the previous frame comprises a frame confidence score that is determined as a sum of a single frame AWB confidence score and an illuminant change score;
   calculating, via a scene invariant illumination chromaticity controller, a final illumination chromaticity for the current frame as a weighted sum of a scene illumination chromaticity for the current frame and the candidate illumination chromaticity estimate.

2. The method of claim 1, wherein the scene prior chromaticity from the previous frame comprises a frame confidence score that is determined as a sum of a single frame AWB confidence score and an illuminant change score, wherein the single frame AWB confidence score identifies a likelihood that a single-frame based AWB algorithm estimate is correct.

3. The method of claim 2, wherein the single frame AWB confidence score is based on an RGB histogram variability measure.

4. The method of claim 2, wherein the illuminant change score is a likelihood that an illumination change occurs simultaneously with a scene change.

5. The method of claim 1, wherein the scene prior chromaticity for the current frame is to constrain an image formation model to a most likely favorable solution.

6. The method of claim 1, wherein the candidate illumination chromaticity estimate for the current frame is determined via a single frame based AWB algorithm.

7. The method of claim 1, wherein the final illumination chromaticity corresponds to diagonal elements of a matrix A of white balancing gains.

8. The method of claim 1, wherein the final illumination chromaticity is an estimate of white balancing gains in a temporal domain from a sequence of frames.

9. The method of claim 1, wherein the scene prior chromaticity for the current frame is a temporally invariant representation for the current scene illuminant.

10. An apparatus, comprising:
    a white balancer to calculate a candidate illumination chromaticity estimate for a current frame;
    a scene prior monitor to calculate a scene prior chromaticity for the current frame as a weighted sum of a scene prior chromaticity from a previous frame and the candidate illumination chromaticity estimate, wherein the scene prior chromaticity from the previous frame comprises a frame confidence score that is determined as a weighted sum of a single frame AWB confidence score and an illuminant change score;
    a scene invariant illumination chromaticity controller to calculate a final illumination chromaticity for the current frame as a weighted sum of scene illumination chromaticity for the current frame and the candidate illumination chromaticity estimate.

11. The apparatus of claim 10, wherein the weighted scene prior chromaticity from the previous frame comprises a frame confidence score that is determined as a sum of a single frame AWB confidence score and an illuminant change score, wherein the single frame AWB confidence score identifies a likelihood that a single-frame based AWB algorithm estimate is correct.

12. The apparatus of claim 11, wherein the single frame AWB confidence score is based on an RGB histogram variability measure.

13. The apparatus of claim 11, wherein the illuminant confidence score is a likelihood that an illumination change occurs simultaneously with a scene change.

14. The apparatus of claim 10, wherein the scene prior chromaticity for the current frame is to constrain an image formation model to a most likely favorable solution.

15. A system, comprising:
an image capture device;
a memory that is to store instructions and that is communicatively coupled to the image capture device; and
a processor communicatively coupled to the image capture device and the memory, wherein when the processor is to execute the instructions, the processor is to:
calculate a candidate illumination chromaticity estimate for a current frame;
calculate a scene prior chromaticity for the current frame as a weighted sum of a scene prior chromaticity from a previous frame and the candidate illumination chromaticity estimate, wherein the scene prior chromaticity from the previous frame comprises a frame confidence score that is determined as a sum of a single frame AWB confidence score and an illuminant change score; and calculate a final illumination chromaticity for the current frame as a weighted sum of a scene illumination chromaticity for the current frame and the candidate illumination chromaticity estimate.

16. The system of claim 15, wherein the scene prior chromaticity from the previous frame comprises a frame confidence score that is determined as a sum of a single frame AWB confidence score and an illuminant change score, wherein the single frame AWB confidence score identifies a likelihood that a single-frame based AWB algorithm estimate is correct.

17. The system of claim 15, wherein the single frame AWB confidence score is based on an RGB histogram variability measure.

18. The system of claim 15, wherein the illuminant change score is a likelihood that an illumination change occurs simultaneously with a scene change.

19. The system of claim 15, wherein the scene prior chromaticity for the current frame is to constrain an image formation model to a most likely favorable solution.

20. The system of claim 15, wherein the candidate illumination chromaticity estimate for the current frame is determined via a single frame based AWB algorithm.

21. The system of claim 15, wherein the final illumination chromaticity corresponds to diagonal elements of a matrix A of white balancing gains.

22. The system of claim 15, wherein the final illumination chromaticity is an estimate of white balancing gains in a temporal domain from a sequence of frames.

* * * * *